(12) United States Patent
Jain et al.

(10) Patent No.: US 12,672,096 B2
(45) Date of Patent: Jun. 30, 2026

(54) EMERGENCY RESPONSE (ER) SYSTEM FOR HYBRID WORK SOFTPHONE MOBILE DEVICES IN SDA/SDN FABRIC NETWORKS

(71) Applicant: Cisco Technology, Inc., San Jose, CA (US)

(72) Inventors: Prakash C. Jain, Fremont, CA (US); Aaditya Nitin Vadnere, Indore (IN); Parthiv Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 353 days.

(21) Appl. No.: 18/242,430

(22) Filed: Sep. 5, 2023

(65) Prior Publication Data

US 2025/0081157 A1 Mar. 6, 2025

(51) Int. Cl.
*H04W 64/00* (2009.01)
*H04W 28/02* (2009.01)

(52) U.S. Cl.
CPC ..... *H04W 64/006* (2013.01); *H04W 28/0205* (2013.01); *H04W 28/0263* (2013.01)

(58) Field of Classification Search
CPC ........... H04W 64/006; H04W 28/0205; H04W 28/0263; H04L 61/103; H04L 67/55; H04L 67/52; H04L 2101/69; H04M 1/2535
See application file for complete search history.

(56) References Cited

U.S. PATENT DOCUMENTS

| | | | | |
|---|---|---|---|---|
| 2008/0004072 A1* | 1/2008 | Yu | .......................... | H04W 12/08 |
| | | | | 455/554.2 |
| 2014/0229945 A1* | 8/2014 | Barkai | .................... | H04L 49/70 |
| | | | | 718/1 |
| 2015/0312738 A1* | 10/2015 | Deich | .................. | H04M 3/5116 |
| | | | | 370/328 |
| 2019/0355231 A1* | 11/2019 | Shaw | ........................ | H04Q 9/00 |
| 2020/0389426 A1* | 12/2020 | Enguehard | .............. | H04L 63/10 |
| 2021/0084480 A1* | 3/2021 | Maier | ..................... | H04W 4/90 |
| 2021/0185752 A1* | 6/2021 | Samuel | ............... | H04L 63/0272 |

(Continued)

OTHER PUBLICATIONS

Alden, et al., "A LISP-Based Implementation of Follow Me Cloud", IEEE Access, vol. 2, Nov. 14, 2014, pp. 1340-1347 (Year: 2014).*

(Continued)

*Primary Examiner* — Yuwen Pan
*Assistant Examiner* — Swati Jain
(74) *Attorney, Agent, or Firm* — Lee & Hayes, P.C.

(57) ABSTRACT

Techniques for identifying locations of network devices in a fabric network. The method includes a network controller and/or control plane of a network fabric coupled to an access switch at a software-defined access (SDA) site. At least one mapping is registered at the SDA site and sent with the location data from the access switch to the network controller. The network controller and/or control plane is configured to at least one of to learn, update, and publish location data of a destination address from at least one mapping received from the access switch by the location data being associated with a mapping at the SDA site and destination address. The network controller identifies the location of the destination address from a received request based on associating the destination address with the location learned from the location data of at least one mapping that has been registered at the SDA site.

19 Claims, 9 Drawing Sheets

610 — Communicatively Coupling Network Controller/Control Plane with Access Switches to Receive IP Address and Locations in Mappings from Local Map Servers from an Extended Access Network of the Network Fabric 615 — Registering by the Local Map Server at the Extended Access Network Registers New or Updates of Mappings with Location Data of Network Devices Deployed in the Network 620 — Learning by the Network Controller/Control Plane of Updated Location Data Associated with an Access Switch from a Mapping Received from the Access Switch 625 — Identifying a Location of a Destination Address Received by the Network Controller/Control Plane in Response to a Request from an Emergency Responder Controller 630 — Storing New and Updates of Mappings at a Network Control Plane 635 — Identifying a Location based on an Entry of a Mapping in a Database 640 — Updating a Change of Location of a Network Device in a Mapping Stored in a Database or In Response to a Request Received

(56) References Cited

U.S. PATENT DOCUMENTS

| 2021/0195024 A1* | 6/2021 | Gujar | G06F 16/955 |
| 2021/0218794 A1* | 7/2021 | Jain | H04L 41/0823 |
| 2022/0117033 A1* | 4/2022 | Maria | H04W 4/021 |
| 2022/0158943 A1* | 5/2022 | Jain | H04L 45/745 |

OTHER PUBLICATIONS

Cisco.com Understand Cisco Emergency Responder (CER) Jan. 9, 2023 (Year: 2023).*

R. Casellas et al., "SDN orchestration of OpenFlow and GMPLS flexi-grid networks with a stateful hierarchical PCE [invited]," in Journal of Optical Communications and Networking, vol. 7, No. 1, pp. A106-A117, Jan. 2015. (Year: 2015).*

Alden, et al., "A LISP-Based Implementation of Follow Me Cloud", IEEE Access, vol. 2, Nov. 14, 2014, pp. 1340-1347.

Search Report and Written Opinion for International Application No. PCT/US2024/044271, Dated Dec. 6, 2024, 15 pages.

Cisco.com Understand Cisco Emergency Responder (CER) Jan. 9, 2023.

* cited by examiner

100

Unified Communication Manager(UCM)
10

Emergency Responder(ER)
20

25

Building 1
30

Building 2
35

Voice Vlan
10.1.1.0/24

Voice Vlan
20.1.1.0/24

45

55

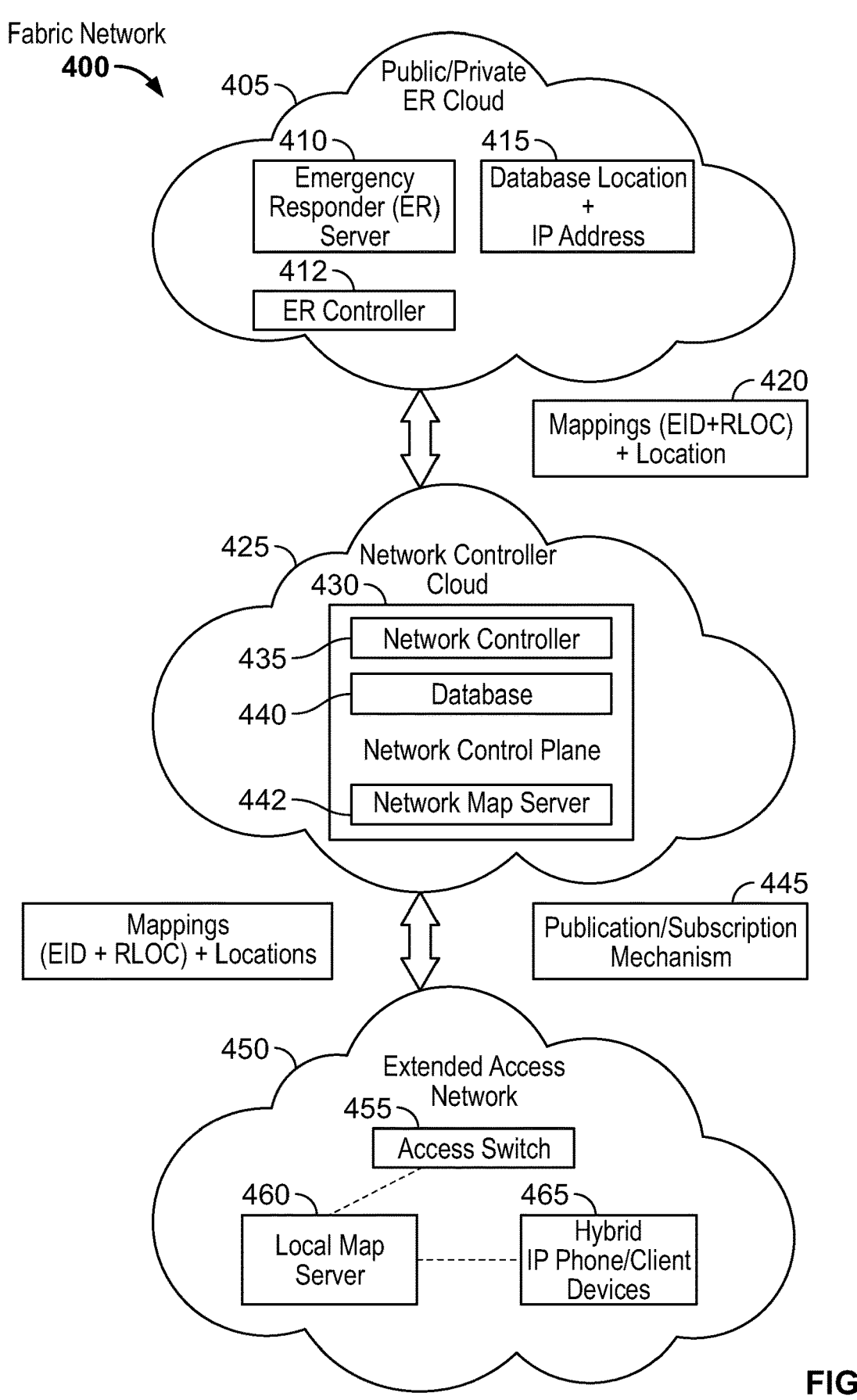

Fabric Network
400

405 — Public/Private ER Cloud

410 — Emergency Responder (ER) Server

415 — Database Location + IP Address

412 — ER Controller

420 — Mappings (EID+RLOC) + Location

425 — Network Controller Cloud

430 — Network Control Plane

435 — Network Controller

440 — Database

442 — Network Map Server

Mappings (EID + RLOC) + Locations

445 — Publication/Subscription Mechanism

450 — Extended Access Network

455 — Access Switch

460 — Local Map Server

465 — Hybrid IP Phone/Client Devices

FIG. 4

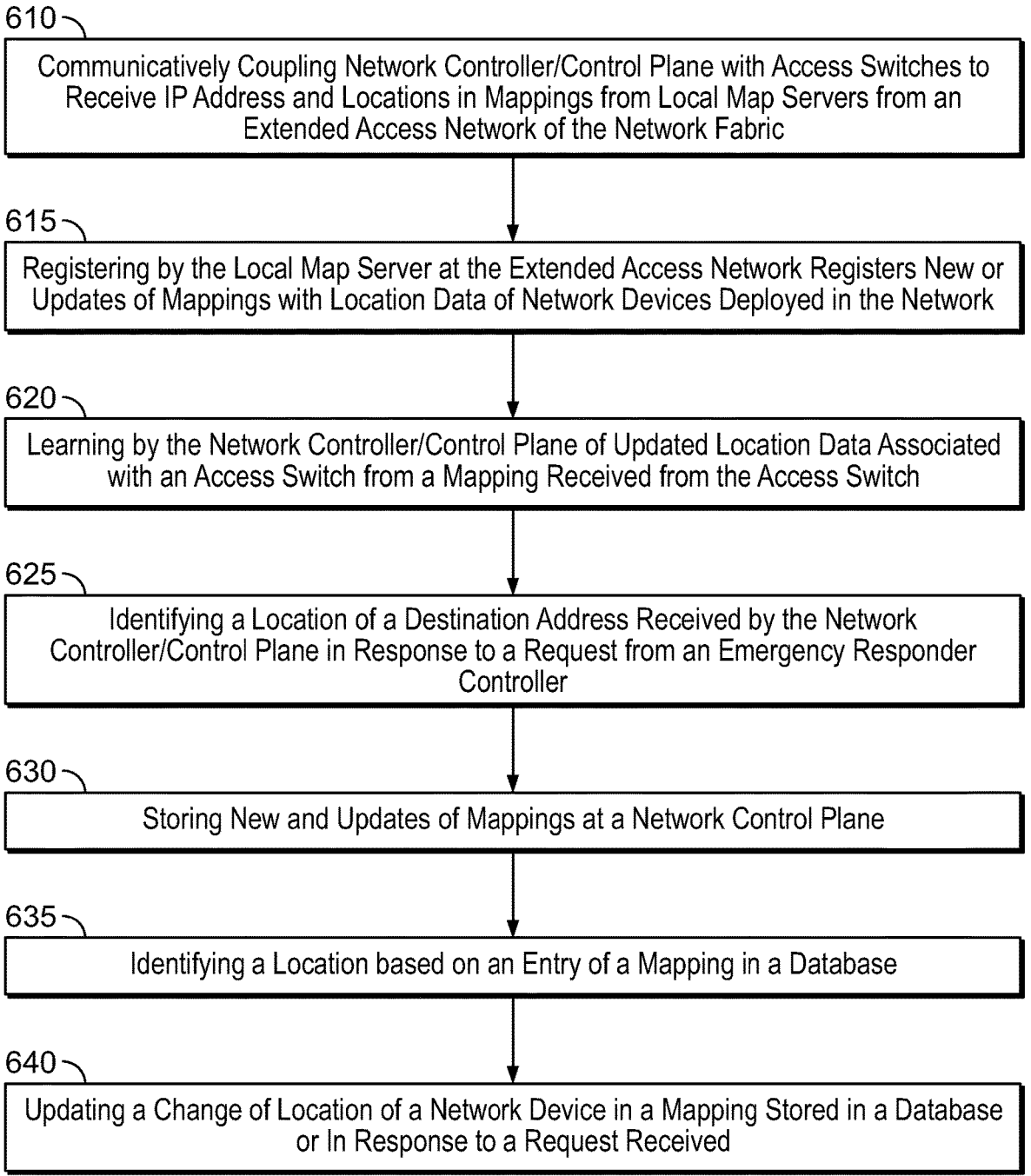

610
Communicatively Coupling Network Controller/Control Plane with Access Switches to Receive IP Address and Locations in Mappings from Local Map Servers from an Extended Access Network of the Network Fabric 615
Registering by the Local Map Server at the Extended Access Network Registers New or Updates of Mappings with Location Data of Network Devices Deployed in the Network 620
Learning by the Network Controller/Control Plane of Updated Location Data Associated with an Access Switch from a Mapping Received from the Access Switch 625
Identifying a Location of a Destination Address Received by the Network Controller/Control Plane in Response to a Request from an Emergency Responder Controller 630
Storing New and Updates of Mappings at a Network Control Plane 635
Identifying a Location based on an Entry of a Mapping in a Database 640
Updating a Change of Location of a Network Device in a Mapping Stored in a Database or In Response to a Request Received

FIG. 6

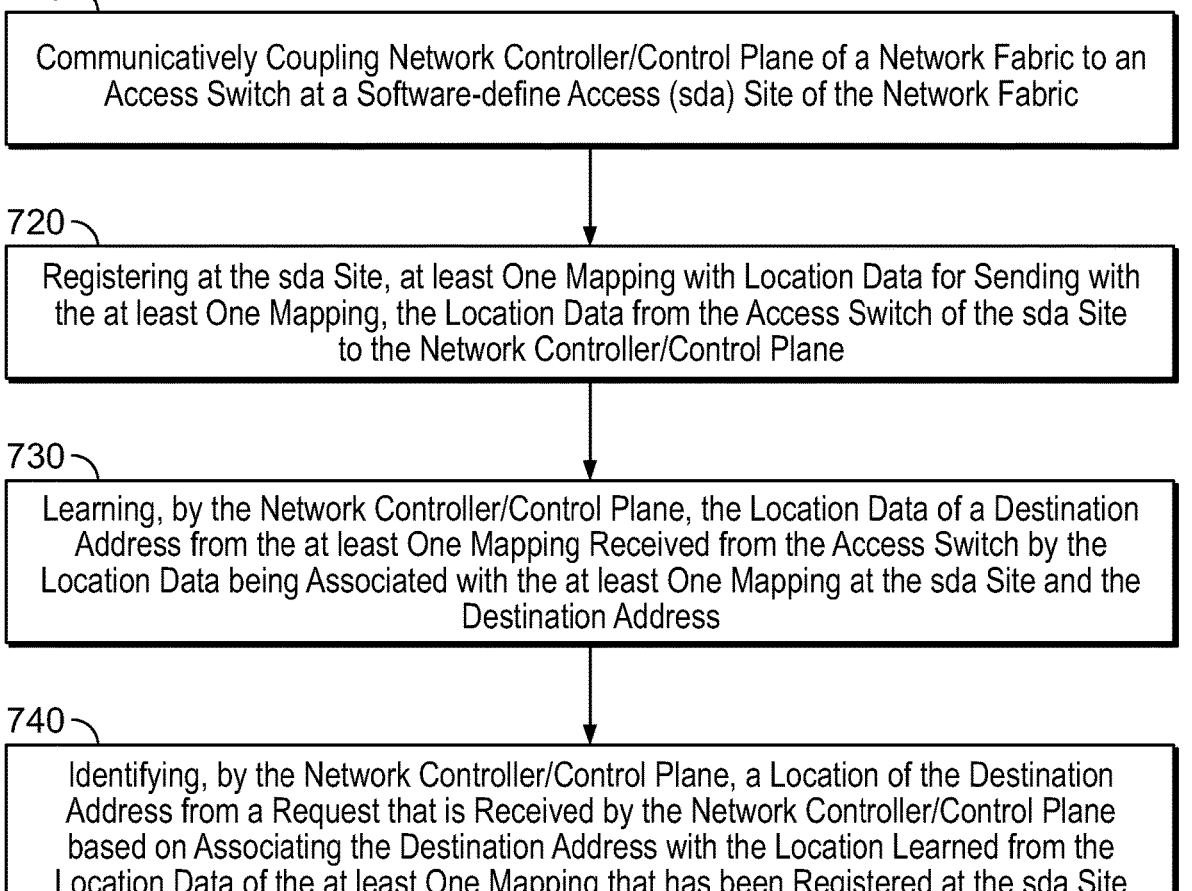

710 —

Communicatively Coupling Network Controller/Control Plane of a Network Fabric to an Access Switch at a Software-define Access (sda) Site of the Network Fabric

720 —

Registering at the sda Site, at least One Mapping with Location Data for Sending with the at least One Mapping, the Location Data from the Access Switch of the sda Site to the Network Controller/Control Plane

730 —

Learning, by the Network Controller/Control Plane, the Location Data of a Destination Address from the at least One Mapping Received from the Access Switch by the Location Data being Associated with the at least One Mapping at the sda Site and the Destination Address

740 —

Identifying, by the Network Controller/Control Plane, a Location of the Destination Address from a Request that is Received by the Network Controller/Control Plane based on Associating the Destination Address with the Location Learned from the Location Data of the at least One Mapping that has been Registered at the sda Site

FIG. 7

EMERGENCY RESPONSE (ER) SYSTEM FOR HYBRID WORK SOFTPHONE MOBILE DEVICES IN SDA/SDN FABRIC NETWORKS

TECHNICAL FIELD

The present disclosure relates generally to providing access for software-defined access (SDA)/software-defined network (SDN) sites.

BACKGROUND

In an enterprise environment, phones may be deployed as Internet protocol (IP) desktop phones. Though, with a hybrid work environment, going forward, the desktop IP phones are migrating towards softphones in the laptop (e.g., Webex teams) that allow access via the laptop client. Since desktop IP phones are fixed wired phones, it is convenient to discover their physical location for any Emergency Response system in the Enterprise but often this is not the case with softphones. The Locator ID Separation Protocol (LISP) splits the device identity, known as an Endpoint Identifier (EID), and its location, known as its Routing Locator (RLOC), into two different numbering spaces in a fabric network. The location of the desktop IP phone can be correlated to the location identified or defined with the source IP address of an endpoint.

However, with subnets that are stretched, the IP address (i.e., source IP address) of the endpoint is static (i.e., the IP address does not change as the device location is changed or moved). Hence finding the location information based on the source IP address/subnet of the endpoint proves difficult as it is not reliable as it may not always correlate or be the same as the endpoint's actual location. For an Emergency Response (ER) System having a current updated location for the IP address is a priority, therefore, there is needed a mechanism to update the location information of an endpoint for use as the reliable location data required by an ER system.

It is desirable to implement a process in combination with a publication subscription mechanism that provides updated location-specific information to at least a centralized SDA/SDN controller/control plane that is accessible by either an ER system or site's controller/control plane that allows subscribers of device mappings to receive current location data associated with client devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a diagram of the flow process between various sites of a fabric network of sending mappings and locations of client devices from an extended access network via a network control cloud to the emergency responder cloud.

FIG. 6 illustrates a flowchart of an example method for registering and sending updates of new locations of hybrid IP phones or other client devices at SDA sites or other extended access networks to a controller or transit site that in turn is used to receive locations of client type devices by an emergency responder system.

FIG. 7 illustrates a flowchart of an example method for identifying a location of a requested source or destination IP address using location data from mappings of registered network devices at SDA site or extended access network.

DESCRIPTION OF EXAMPLE EMBODIMENTS

Overview

Figure 1:
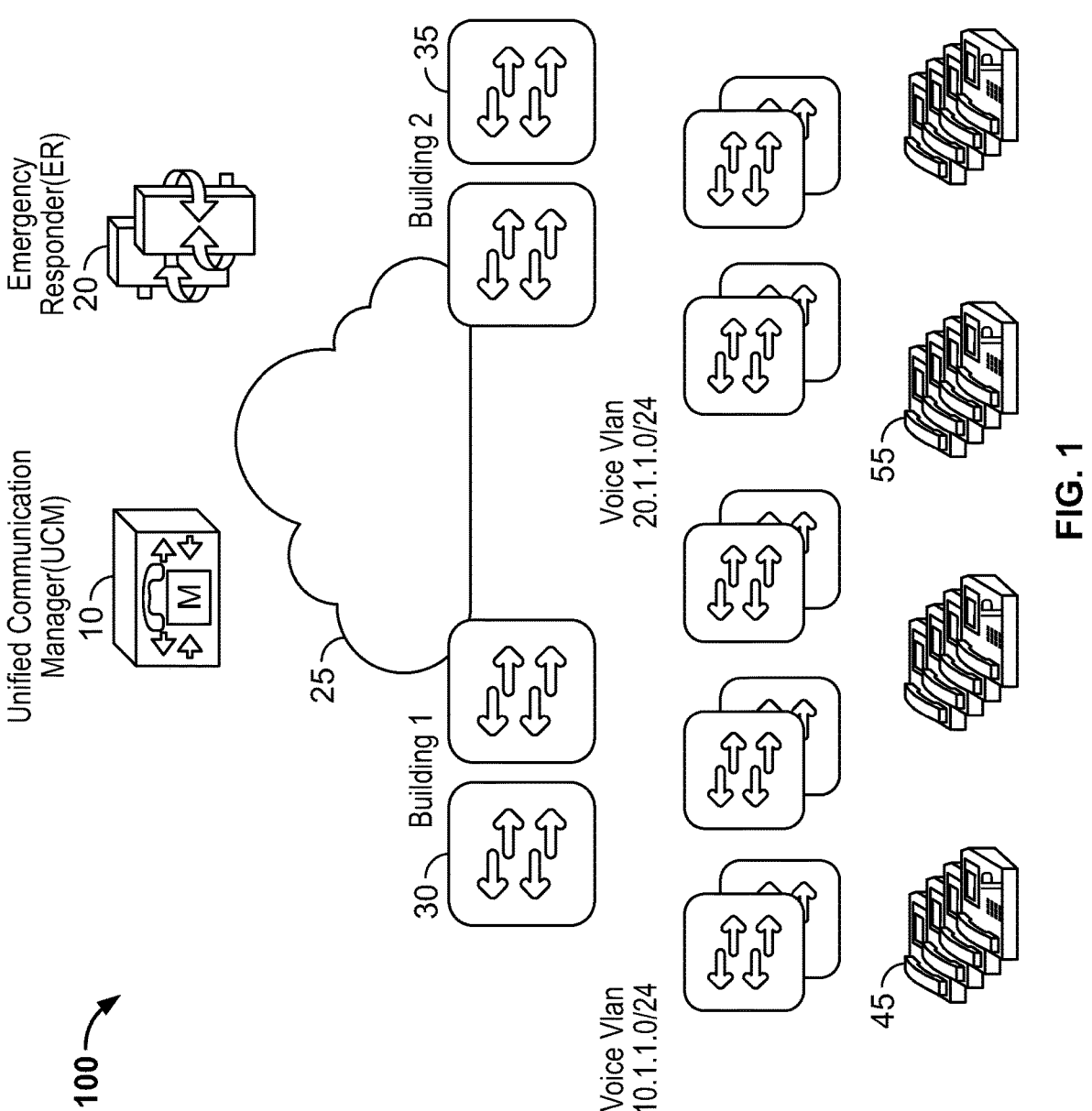
FIG. 1 illustrates an exemplary pre-overlay network without software-defined access (SDA).

This disclosure describes techniques to register location information from access switches in the SDA/SDN network to an SDA/SDN control plane or controller, to access stored location information from access switches in the SDA/SDN network by an Emergency Response (ER) System, and to update stored location information for an ER system so the ER system is configured with current location-specific information of various clients and mobile devices of a fabric network based on device mapping data received from an SDA/SDN control plane or controller. The SDA/SDN control plane or controller can store and provide the up-to-date information of all or nearly all hosts (i.e., SDA/SDN sites) in a network by using a publication subscription mechanism that propagates location information on new mobile clients, and changes to existing stored mobile client location information accurately and immediately. The process allows the ER system to have access to or to store location information from access switches at host networks that are updated via a pub-sub mechanism of the location-specific information.

Additionally, the techniques described herein may be performed by a system and/or device having non-transitory computer-readable media storing computer-executable instructions that, when executed by one or more processors, performs the method described above.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The following examples describe a fabric network. However, this is an example, and embodiments of the disclosure are not limited to fabric networks and may be used in conjunction with fabric or non-fabric networks for example.

A fabric network may be considered a network topology in which components pass data to each other through interconnecting network nodes (e.g., devices). The network fabric can include a mesh of connections between network devices such as access points, switches, and routers that transports data to its destination. In some embodiments, the fabric of the fabric network may be defined as the physical wirings that make up these connections or it may refer to a virtualized, automated lattice of overlay connections on top of the physical topology. The fabric networks may be divided into an overlay and an underlay architecture. The underlay architecture provides for interconnectivity between network devices in one or more fabric networks while the overlay architecture provides for routing of data traffic that is transmitted throughout the fabric network.

The fabric network overlay components can include fabric Edge Devices (EDs), fabric intermediate devices, fabric Border Devices (BDs), a Map Server (MS), and a fabric Control Plane (CP). In the fabric network overlay, edge devices may be enabled with data packet protocols such as a Locator/ID Separation Protocol (LISP); nodes configured with an xTR (Ingress/Egress Tunnel Router) or can be PxTR (Proxy xTR) nodes, border devices that may include for example, LISP PxTR (Proxy xTR) nodes, and endpoints (e.g., client devices, mobile clients, or hosts) that may be attached to the edge devices of a fabric. The endpoints may be identified by an Endpoint Identifier (EID). Each device in the fabric network may be configured with an address (e.g., a locator address). Edges devices may register discovered EIDs (from the endpoints) with a fabric host-tracking database at a local map server associating the discovered EID to, for example, the locator address of a subnet.

The fabric overlay may provide stretched Layer-2 service using a Layer-3 overlay, which may provide the flexibility of extending a subnet to any part of the fabric network. For example, a subnet may be present across multiple fabric edge devices with the same anycast gateway Internet Protocol (IP) address to allow for roaming by allowing endpoints to continue using the same gateway IP address. The provided services may also include Layer-3 overlay service and built-in mobility.

In some embodiments, the edge device is a hybrid work softphone that is not configured at a fixed place with a fixed subnet. Because the softphones are mobile devices, their location cannot easily be determined from associated or identified subnets. Also, in new Enterprise networks, the SDA/SDN fabric-based systems enable VLANs/subnets to be extended across the entire Enterprise. The hybrid work softphone (e.g., a laptop client) can also move across the enterprise without changing its IP address, as the IP address is configured as an endpoint identifier (EID) and is a static IP address while (in a LISP) only the routing locator (RLOC) is dynamic and changes as the hybrid softphone (e.g., the laptop) are physically moved from location to location. As a result, identifying the correct location or determining location-specific information about the hybrid softphone is complex and may not always be reliable when using techniques that rely solely on the IP address to identify the mobile device location.

In some embodiments, the map server (fabric or network map server) of a control plane is queried by a remote device (i.e., edge device or client) or from an access switch that is located behind a destination address. For example, at an access side of an SDA site; this can be a network device at the fabric edge. In some embodiments, a subscription publication mechanism can be enabled in which a pop-server subscription service allows the network (fabric) map server to be registered with mappings of devices and clients in the fabric network, and to receive updates of new addresses without having to make requests. In the Location Identification Separation Protocol (LISP), the location is automatically defined as the access switch address which can be different from the location of the edge device as well as the physical location of the endpoint.

In some embodiments, an overlay network is configured in the fabric network with an underlay network configured with an underlay switch that has a protocol with a router location (RLOC) that identifies the current source or destination IP address of the fabric edge device or client; as only the RLOC is changed in the protocol to be associated with an endpoint IP address that remains static or unchanged in the protocol.

Although exemplary embodiments of the disclosure describe systems and methods are described using LISP protocols and vendor based SDA solutions may enable a LISP based protocol, it is contemplated that the disclosure is not so limiting, and should be broadly construed to encompass other types of protocols with similar or same solutions enabled. For example, that may be implemented using an overlay protocol such as BGP-EVPN with centralized route reflector. In some embodiments, the BGP-EVPN protocol is extendible to the SDA solutions disclosed and may provide an option for a customer choice between different overlay protocols. In some embodiments, the different types of overlay protocols (e.g., LISP or BGP-EVPN) are used in an overlay network that is configured in the fabric network with an underlay network configured with an underlay switch using either or both protocols to identify the current source or destination IP address of the fabric edge device or client.

In some embodiments, methods and systems are implements with a controller and/or control plane together or separately. It is contemplated, that use of both options are feasible (i.e., are interchangeable) for provisioning, monitoring, protocol operations, and updates described. In some embodiments, SDN controllers may experience greater latencies in operations, and a preference may be to enable centralized control plane devices. For example, SDN controllers may be used for provisioning and monitoring based on latency considerations while control plane devices (with reduced latencies) may be used for protocol operations and for faster updates. In some implementations both controller devices and the control plane may be configured with a same node location or border device.

Although the systems and methods described herein are discussed with respect to one or more component hosts, these systems and methods may be used with any type of device or system. Further, although particular examples are discussed with reference to component machines, alternate embodiments may include other types of devices including virtual devices that are bridged or located on a centralized connected (internal or external) platform.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an exemplary pre-overlay network without software-defined access (SDA). In FIG. 1, in the pre-overlay network 100, phones 45,55 register with the unified communication manager 10. The emergency responder 20 is integrated with the unified communication manager 10, and the emergency response locations (ERLs) are defined in the emergency responder 20. The switches 40,50 are underlay configured, and each location, Bldg. "1", and Bldg. "2" is configured with a different subnet; Bldg. "1" with a first subnet 30 and Bldg. "2" with a second subnet 35. The subnet information for each subnet and the source IP address is carried in a database of a unified communication manager 10.

Figure 2:
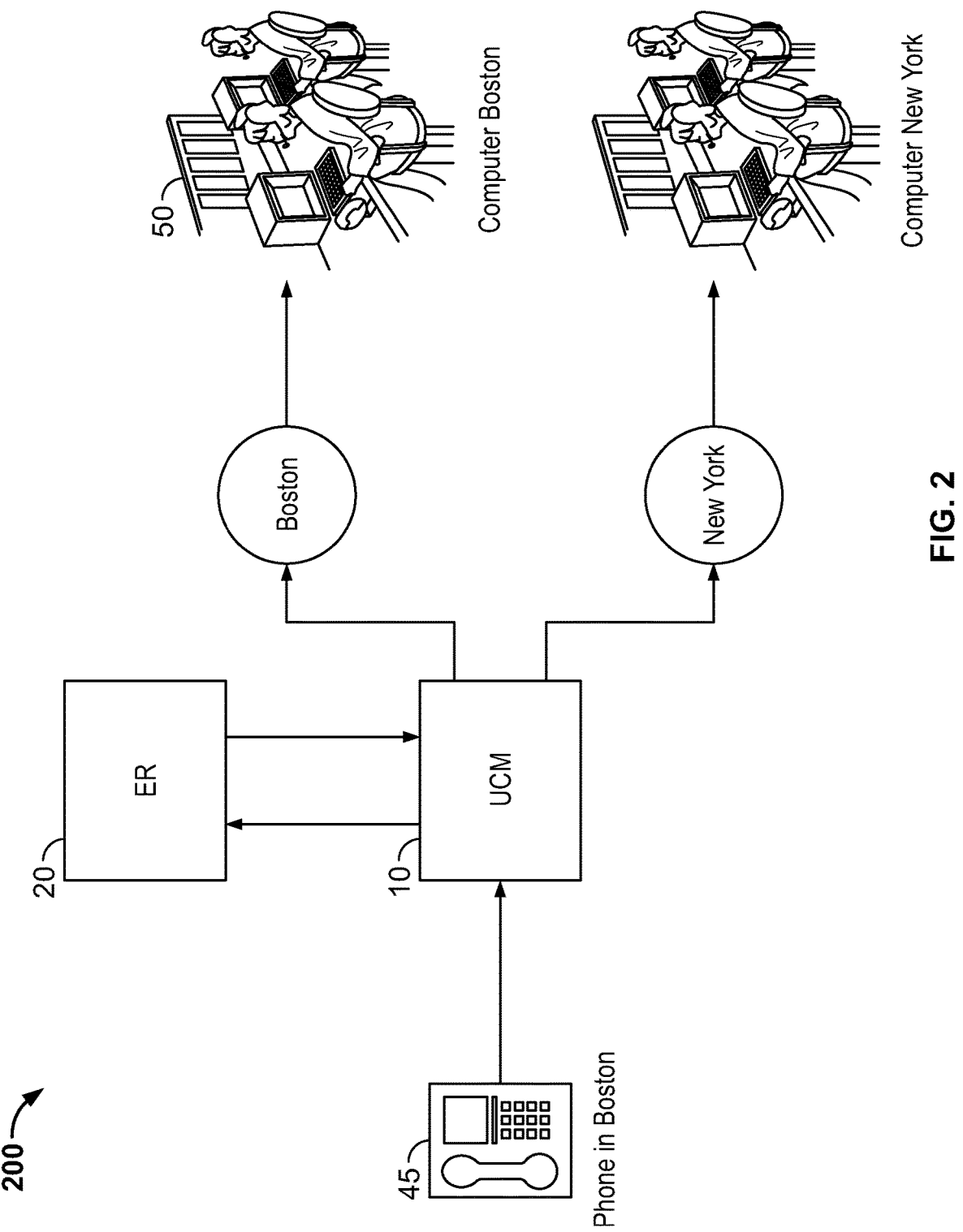
FIG. 2 illustrates an exemplary underlay network with a fixed subnet in an enterprise network.

FIG. 2 illustrates an exemplary underlay network 200 with a fixed subnet in an enterprise network. In FIG. 2, if a call is made from phone 45 with the IP address 10.1.1.0/24, the IP address with configured with the first subnet 30 of Bldg. 1., so the location of the physical location of the IP address 10.1.1.0/24 is associated with the physical address of Bldg. 1., as the first subnet 30 (of FIG. 1) has the physical address information. Hence, for the source IP address 10.1.1.0/24, its physical location is identified by the first subnet 30 physical address location information. The IP address 20.1.1.0/24, is identified with the second subnet 35 physical location information. In an implementation, when a call is made from an IP phone 55, the IP address 20.1.1.0/24 identified is associated with the physical location of Bldg. 2 and is associated with the second subnet's 35 (of FIG. 1) physical address information. In the pre-fabric or pre-SDA environment, for example, at step (1) when an IP phone 45 dials 911, the call gets routed to the unified communication manager 10. At step (2), the unified communication manager 10 sends the call information to the emergency responder 20 which identifies the source IP address of the phone 45. At step (3), the emergency responder has a mapping of the automatic location information (ALI) to the voice subnet. At step (4) the emergency responder 20 provides the emergency response location (ERL) to the unified communication manager 20. At step (5) the unified communication manager 10 sends the ERL to the public safety answering point (PSAP) 50, and the dispatcher can get the physical address and the callback number.

Figure 3:
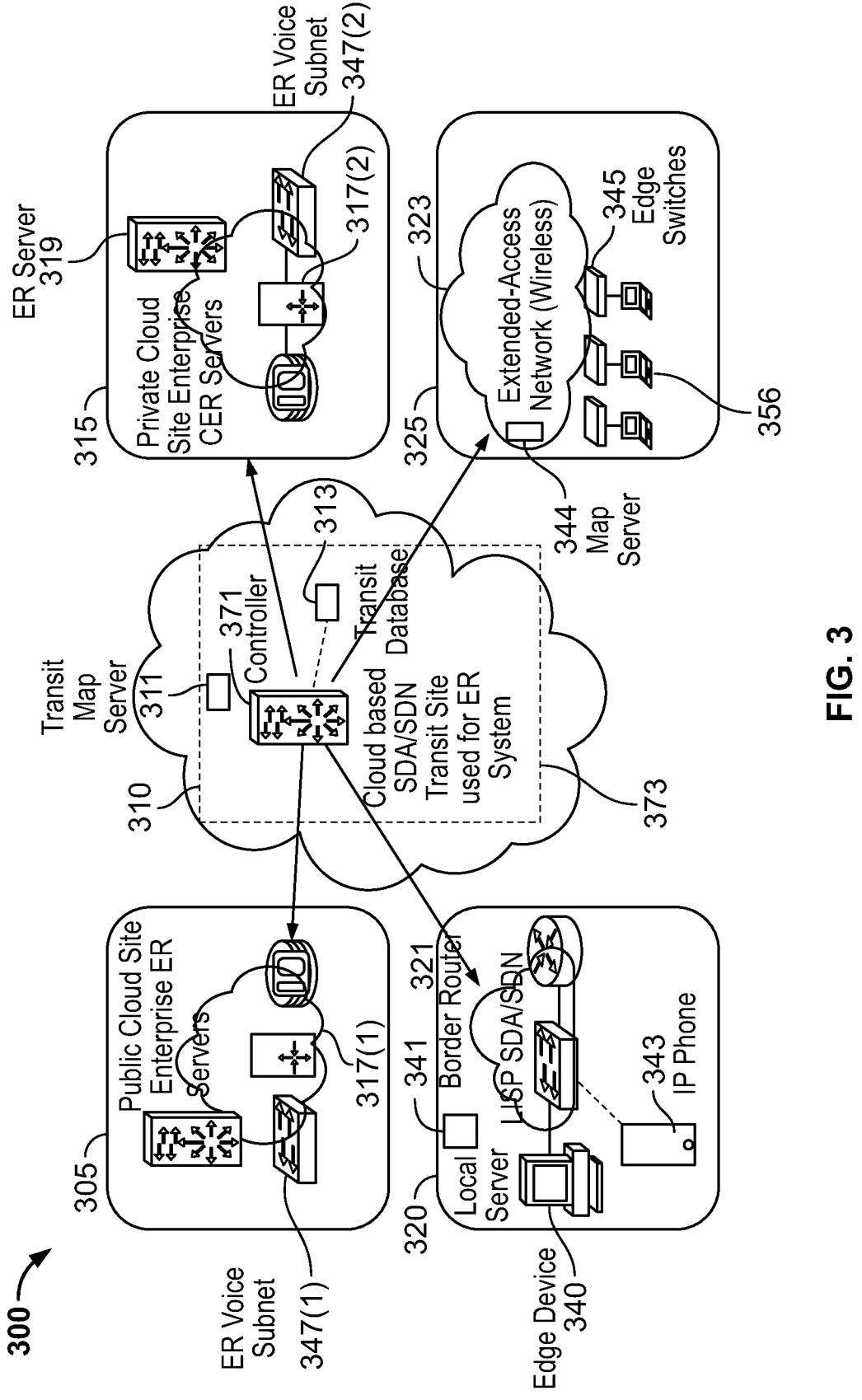
FIG. 3 illustrates a system-architecture diagram of an exemplary fabric network containing multiple devices, multiple Software-Defined Access (SDA) sites, and extended access networks that are connected to a cloud-based SDA/SDN transit site of a fabric network.

FIG. 3 illustrates a system-architecture diagram of an exemplary network 300 containing multiple devices, multiple Software-Defined Access (SDA) sites, and extended access networks that are connected to a cloud-based SDA/SDN transit site of a fabric network.

In FIG. 3, there is illustrated a network 300 in which multiple sites consisting of a public cloud site (public site 305) configured for Enterprise Responder (ER) services, a private cloud site (private site 315) configured for ER services, an SDA site 320 in which all endpoints are registered with RLOCs and Locations in mappings, and an extended access network 325 are each interconnected by a cloud-based SDA/SDN transit site ("transit site") 310 that publishes locations of each RLOC associated with an endpoint for retrieving physical or coordinate address information of an internet protocol (IP) phone 343, edge switches 345 or other edge devices. In some embodiments, the transit site 310 is configured to relay mappings with the location information that may be stored in a transit database 313 or with a transit controller 371 (or at the control plane 373) to either the public or private cloud sites. Transit site 310 can be configured as a virtual site or an SDA site of a fabric network. The mappings may be configured in the format of an EID and RLOC with the current location information being assigned to the RLOC so that an IP address of an access switch can be sent to either the public or private cloud site with the physical or coordinate data to determine the endpoint location.

In some embodiments, the mappings can be received via a publishing subscription mechanism from either the SDA site 320 or the extended access network 325 that may consist of edge devices such as wireless or hybrid IP softphones. In either the SDA site 320 or extended access network 325, the destination or edge devices can include, edge switches, IP phones, hybrid IP softphones, or other edge devices that register with a locally configured map server. For example, at the SDA site 320, the edge device 340 or an IP phone 343 would register one or more mappings with its local map server 341.

In some embodiments, the local map server 341 would be configured with a mapping format to register endpoint mapping information in a LISP protocol where the RLOC stores the current physical or coordinate location information of an edge device 340 or an IP phone 343. The mappings can be learned or made available to a border router 321 or other border devices that subscribe to a transit controller 371 (or transit (network) map server 311) or the control plane 373. In some embodiments, the local map server 341 would be configured with another mapping format to register endpoint mapping information in a BGP-EVPN protocol that (similarly) stores the current physical or coordinate location information of an edge device 340 or the IP phone 343.

In some embodiments, at the SDA site 320, the RLOC and the location information for either the IP phone p or the edge device 340 may be registered at a local server 341 when deployed. The border router 321 (i.e., the access device) learns of new location information associated with a change of the physical location of the IP phone 343 or learns of a newly registered edge device 340. The RLOC stored with the mapping at the local map server 341 of the SDA site 320 is updated with the new physical location information. Since, the SDA site 320 subscribes to the transit controller 371 or transit map server 311, the updated location information of the RLOC is published with the mapping of the registered access point, edge device, or IP phone for storing at the transit site 310. In some embodiments, a transit database 313 may be configured with the transit map server 311 or the transit controller 371 that contains up-to-date mappings of RLOCs with the respective source IP addresses of the access devices or other (fabric) edge device or the like of the SDA site 320. The RLOC and location information of the edge device constitute the underlying network destinations, and each different source IP address can be associated with an access device or other border device to send or publish to the transit site 310.

In some embodiments, when an IP phone 343 (at an SDA site 320, as an example) dials 911 to either the public or private emergency responder (ER), the call may be routed to a transit site 310. Transit site 310 may receive a request from either the public or private ER sites for the physical location information of a source IP address associated with the call. The transit controller 371 would possess the current location information in the RLOC for a published mapping of the IP phone 343 and send the location information to either the public or private ER sites. In some embodiments, the private site 315 for ER services may consist of one or more ER servers 319 that may include or be linked to a database 317(2) used for ER services that are configured to store source IP addresses associated with mappings and location data, and that may host a database 317(1) storing mappings of the Automatic Location Information (ALI) to a voice subnet 347(1) that provides the Emergency Response Location (ERL) to the transit site 310.

In some embodiments, database 317(2) may enable access with a border router (or border node with LISP PxTR protocol). The Transit site 310 sends the info associated with the source IP of the IP phone 343 to the private site 315 for ER services which receive the IP address (i.e., the source IP address of the IP phone 343). The private site 315 for ER services is configured with a plurality of ER servers 319 that may host a database 317(2) storing mappings of the Automatic Location Information (ALI) to a voice subnet 347(2) that provides the Emergency Response Location (ERL) to the transit site 310. The transit site 310 sends the ERL to the PSAP (Public Safety Answering Point), and the dispatcher gets the physical address and callback number.

For the extended access network 325, with hybrid work softphones 356 that are not located at the fixed place with the fixed subnet 323. The softphones 356 are mobile so their location cannot be determined from subnet 323 as the subnet location may not be the same as the location of the mobile softphone 356. Also, in extended access networks 325 (e.g., enterprise networks), because the SDA/SDN sites are fabric based, the VLANs and subnets can be extended across the enterprise locations. The Softphones 356 (e.g., the laptops) can be moved to different locations across the extended access network 325 without changing their IP address, and therefore one or more locations may have the same IP address but be located at different coordinates or physical locations.

In some embodiments, the address information of the IP phone 343 is determined with location coordinate information associated with the RLOCs, for example of an access switch, and the ER (public or private) site receives the location data extracted from the RLOC from the SDA site 320 as the defined location of the IP phone 343 or softphone 356 (as the coordinates or physical address of the device). In an exemplary embodiment, the location information of the IP phone 343 or softphone 356 can be published to the map server 311 at the transit site's 310 control plane 373 or transit controller 371 (e.g., LISP protocol map-server) so it would be available with an (Eid-RLOC) mappings in the control plane 373 (e.g., at a LISP Multi-Service Switch Router (MSMR)). In some embodiments, the location and proximity-based border registration is configured to extend the location mechanism to fabric edges RLOCs where endpoints are connected.

In hybrid cloud services as an example, the cloud-based Transit MSMR (e.g., cloud plane 373) is extended with a hybrid cloud-based service architecture to enable the endpoint location information to be available at the cloud-based Transit control plane 373 (i.e., a transit MSMR) for conveyance to the Emergency Response (ER) sites. This location information can be kept up to date in the transit map server 311 using a LISP registration with a publication subscription mechanism. In some embodiments, the ER private site 315 or the ER public site 305 can then receive the location information from the transit map server 311 for storing at a database 317(1) using one of the following mechanisms: a LISP client hosted at the public site 305 or the private site 315 for ER services that connect to the subscriber to receive all available published endpoint RLOCs and locations from the transit control plane 373 (e.g., transit MSMR), or by using a publication from an assurance APP/SDA/SDN controller hosted at the either or both sites to get updated and accurate endpoint information at the public ER site system (e.g. if a LISP client not feasible to be implemented).

In some embodiments, by enabling the learning of the endpoint locations at the transit control plane 373, and to reside at the transit map server 311, the scaling of a plurality of endpoint locations with destination addresses can conveniently be accomplished. Further, when the host SDA site joins the network, it is registered in the list mapping, and separate registering by the edge switch or border router is not required.

In some embodiments, the border router of a subnet 323 at a site of the extended access network 325 is integrated or coupled to a map server 344 (i.e., the local map server of the site). The map server 344 registers all the edge switches 345 at the site of the extended access network 325. The map server 344 registers the endpoint of the edge switches 345 at the site of the extended access network 325 and also the location address for the RLOC of the endpoint with the IP location information of the endpoint in the mapping.

In some embodiments, the location information is conveyed from the edge switch to the transit map server 311 using the LISP publication subscription mechanism that unilaterally informs the (transit) map server 311 about the information on the endpoints, and this, in turn, is published to a database 313 for access by the emergency response systems at the ER public site 305 or the ER private site 315 by respective control planes at either site, using another LISP publication subscription mechanism for the respective control plane that is can be integrated with each the emergency response system or servers.

In some embodiments, the physical or coordinate location from the edge switch is published to its local map server 341 at its SDA site 320, and as soon as any changes are detected then it is published to the database 313 via the transit site's map server 311 to the emergency response systems at the ER sites.

In some embodiments, the transit control plane 373 of the transit site 310 can be a virtual control plane that can register the physical or coordinate location of one or more endpoints of multiple sites to enable advanced notification to the emergency response system of new endpoint location registrations. Also, with the transit control plane 373 configured in the cloud, the publication/population/subscription mechanism in this instance is a cloud-based registration system. For example, a publication subscription mechanism (e.g., execution from a publication/population-server operation to a database 317(2) hosted by servers for ER services at the private site 315) can also be cloud-based so that multiple SDA sites of a fabric interconnected network of sites can be updated. In some embodiments, this can allow for a particular use case where the multiple servers in operation reside in different locations and not at a single host site. For example, servers of the transit site 310, the public site 305, the private site 315, and control plane 373 at the transit site 310 can be located at multiple locations or can be connected in siloed sets or other configurations for parallel processing of operations for multiple SDA site updates depending on the traffic flow.

The logical operations described herein with respect to FIGS. 4, 5A, 5B, and 6-7 may be implemented (1) as a sequence of computer-implemented acts or program modules running on a computing system and/or (2) as interconnected machine logic circuits or circuit modules within computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations might be performed than shown in FIGS. 4, 5A, 5B, and 6-7 which are described herein. These operations can also be performed in parallel, or a different order than those described herein. Some or all of these operations can also be performed by components other than those specifically identified. Although the techniques described in this disclosure is with reference to specific components, in other examples, the techniques may be implemented by fewer components, more components, different components, or any configuration of components.

FIG. 4 illustrates a diagram of the flow process between various sites of a fabric network 400 of sending mappings and locations of client devices from an extended access network via a network control cloud to the emergency responder cloud. In FIG. 4, an emergency responder cloud 405 that may be either a public or private enterprise-based cloud may be configured with its own emergency responder server 410 and database 415 for receiving requests at an ER controller 412 from an IP hybrid phone or other client devices at an SDA site or extended access network 450. In some embodiments, the emergency responder server 410 may be configured to identify locations with IP addresses of client devices such as IP hybrid phones 465 or the like from entries of mappings with IP addresses at a local database 440 where the entries store mappings containing configured in a protocol of an EID and RLOC with the RLOC having the current location of the hybrid IP device. In some embodiments, data of mappings associated with network devices deployed in the fabric network 400 is received via a publication subscription mechanism 420 from a network control cloud 425. The network control cloud 425 may include a network 430 of a network controller 435, a database 440, a map server 442, etc. . . . The network controller 435 learns of new network devices and clients via the publication subscription mechanism 445 employed between the access switch 455 and the network control cloud 425. In some embodiments, a hybrid IP phone 465 is deployed in an extended access network 450, the local map server 460 registers or updates the registry of mapping, and in particular the RLOC in response to a change of location of the hybrid IP phone. This new location information is transferred via the publication subscription mechanism 445 without delay or immediately to update the location data at the database 440 of the network control cloud 425. The network control cloud 425 in turn is configured to provide up-to-date location data of the network device (i.e., the hybrid IP phone 465) t the emergency responder controller 412 in response to requests or to update the location data stored at the database 415 at the emergency responder cloud 405.

Figure 5A:
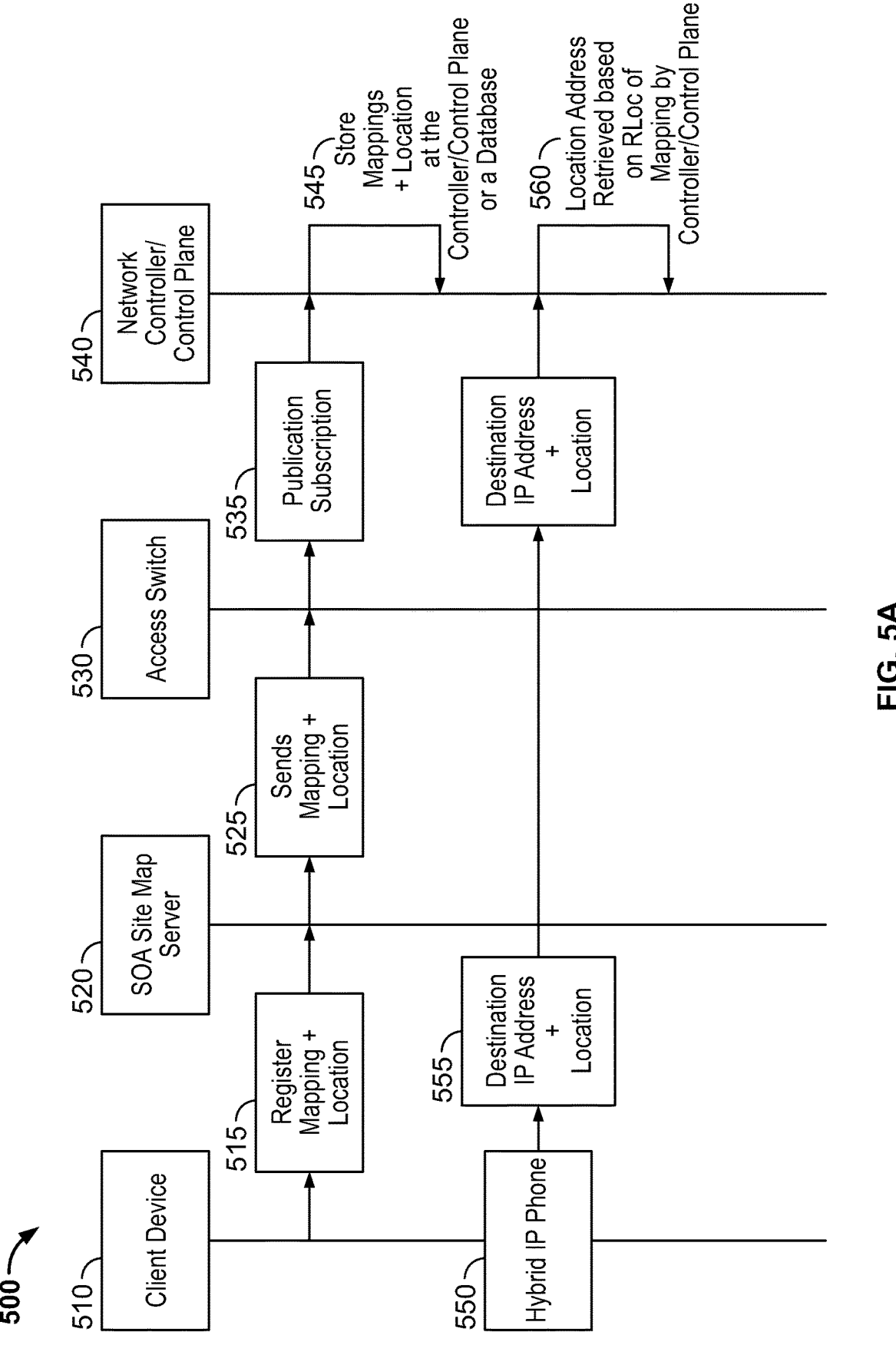
FIGS. 5A and 5B illustrate a flow diagram of an example method sending location data from a mapping registered at a local server to associate with a destination address of a network device to identify the location of the network device in a network fabric in accordance with some embodiments.
Figure 5B:
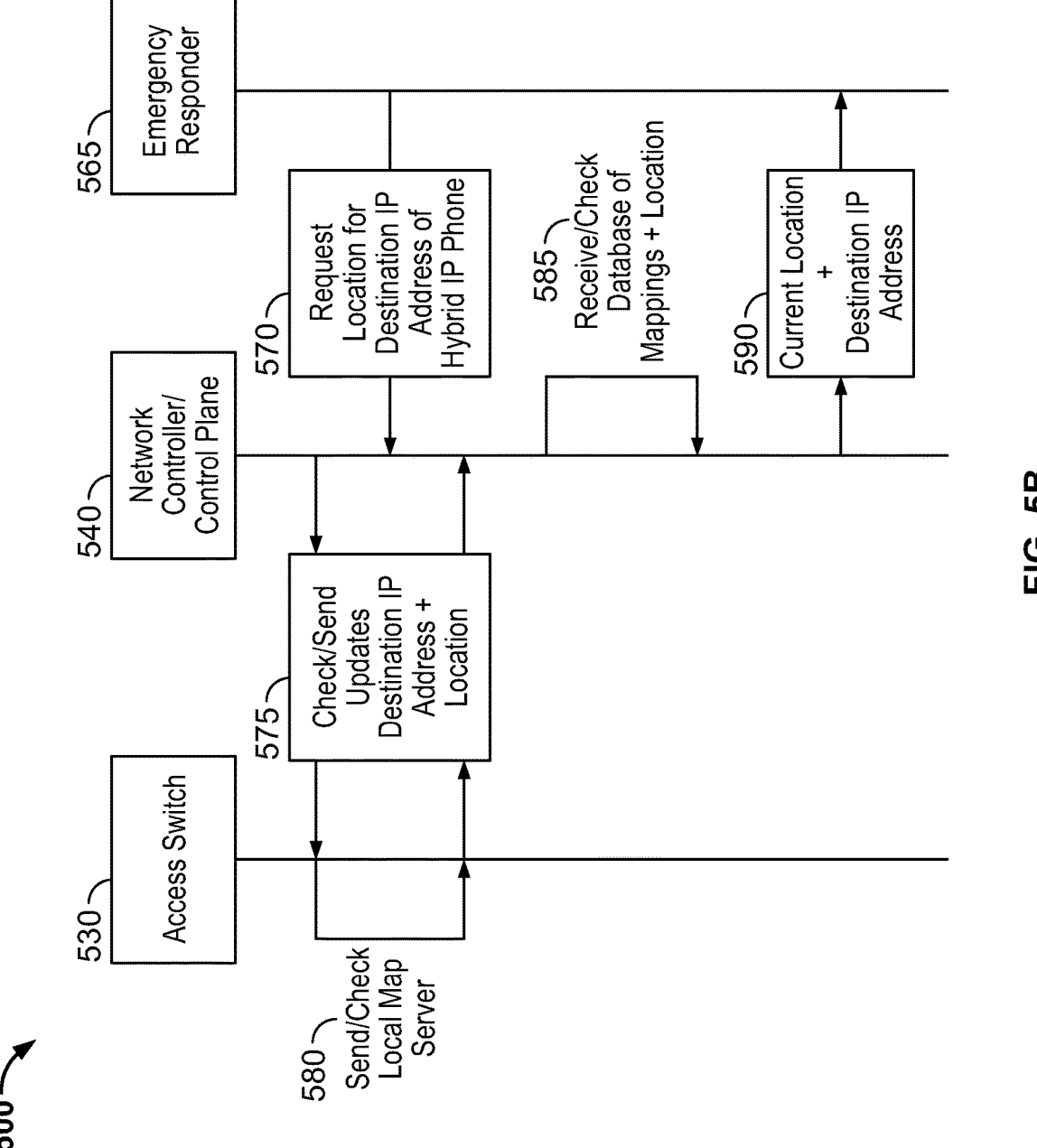

FIGS. 5A and 5B illustrate a flow diagram of an example method 500 sending location data from a mapping registered at a local server to associate with a destination address of a network device to identify the location of the network device in a network fabric in accordance with some embodiments. In FIGS. 5A and 5B, the operations described herein for method 500 may be performed by various components described in FIG. 4.

In some embodiments, the described systems and methods communicatively couple a network controller of a network fabric to an access switch at a software-defined access (SDA) site of the network fabric.

In some embodiments, the described systems and methods may use LISP-based enterprise fabric. In some embodiments, the described systems and methods may use an overlay protocol such as BGP-EVPN with a centralized route reflector.

However, the systems and methods described herein should not be described as limited to any particular protocol and can be used with any overlay/fabric network.

In some embodiments, the described system and methods may be divided into a flow sequence that consists of deployment for network clients in the network fabric and registering of mappings with location data at an SDA site of a fabric network, subscription publication of location data from every access switch in the network fabric to a fabric control plane or controller, and an update the emergency responder with locations of network clients using a pub-sub mechanism that distributes updates in response to changes in physical locations of the mobile clients (i.e., the hybrid IP phones) in the fabric network and the updates are realized in a router location of a protocol mapping format in use.

In FIG. 5A, a network device 510 such as a hybrid IP phone or client is configured with a destination IP address, the destination IP address with location data is registered at 515 at a local or site map server 520. The mapping and the location data are sent at 525 to an access switch 530 and subsequently send via a publication subscription mechanism at 535 to a network controller or control plane 540 (i.e., a controller to orchestrate network functions). The mapping with the location data can be stored 545 at a database at the control plane or with the network controller. In some embodiments, a hybrid IP phone 550 is registered as client device 510 with a destination (source) IP address and location 555 with a mapping that is stored at the local map server 520, and this mapping (i.e., the destination IP address and location) is sent from the access switch 530 to the network controller or control plane 540 where the network controller or control plane at 560 can retrieve the address of the hybrid IP phone from the router location (RLOC) of the mapping that has been sent.

In FIG. 5B, there is illustrated a flow diagram of an exemplary process from an emergency responder (ER) to the network controller or control plane. In some embodiments, an emergency responder (ER) 565 receives a message from a hybrid IP phone and sends a request 570 to identify the location of the destination IP address of the hybrid IP phone to the network controller or control plane 540. The network controller may access an entry of a database at the control plane for the location of the particular destination IP address. Alternately, the network controller or control plane may check or receive at 575 updates of the location via a subscription publication mechanism associated with the destination or source IP address from a local map server via an access switch 530. For example, the check or receive updates of registrations 580 of a local map server at an SDA site for current location data associated with the destination or source IP address; for example, if the hybrid IP phone had been physically moved to a different location in a stretch or extended fabric network.

Alternately, the network controller or control plane may check a database at 585 that contains destination IP addresses and mappings with locations to identify a current location for the hybrid IP phone. At 590, the network controller or control plane may send the current location of the hybrid IP phone to the emergency responder 565. While there is described request flow from an emergency responder

565 to identify a location associated with the destination or source IP address of a network device or client device of an SDA site of a fabric network, it is contemplated there are a variety of ways to implement the process that is not limited to the particular process flow described including gleaning current location data associated with the IP addresses from databases in the network cloud or linked with the emergency responder 565 itself.

FIG. 6 illustrates a flowchart of an example method for registering and sending updates of new locations of hybrid IP phones or other client devices at SDA sites or other extended access networks to a controller, a control plane, or transit site that in turn is used to receive locations of client type devices by an emergency responder system.

At step 610, a network controller or control plane of a network fabric is communicatively coupled in a manner to enable publication subscriptions of source or destination IP addresses and locations of clients, hybrid IP phones, or another network device from an access switch at a software-defined access (SDA) site of an extended access network of the network fabric;

At step 615, the local map server at the SDA site or extended access network registers one or more mappings with location data of network devices deployed in the network site to send the location data of the network device with the mapping from to a network controller or network control plane of a network control cloud from the access switch.

At step 620, the network controller or control plane may learn of updated location data associated with an access switch from a mapping received from the access switch by the location data being registered with the local map server and subsequently published to the network controller or control plane.

At step 625, the network controller or control plane may identify a location of a destination address that is received by the network controller in response to a request from an emergency responder controller based on associating the destination address with the location learned from the location data of a registered mapping at the SDA site.

At step 630, the mapping received at the network control plane may be stored in a database that is operatively connected to the network controller of the network control plane.

At step 635, the mapping is configured with an entry of the database for identifying a location request of the network device by the network controller accessing entries of the database. The mapping of each entry of the database may include a mapping protocol that includes an endpoint identifier (EID) associated with the source IP address of a network device, an SDA site or a subnet, and a router location (RLOC) that dynamically changes its location data to be associated with changes of location or movement of the network device. As an example, a location-to-location change of a hybrid IP phone in a subnet or SDA site where the data of the endpoint identifier remains static while the data of the router location (RLOC) is dynamic and changes with the location change.

At step 640, in response to a change of the location of the network device (i.e., a change of location of the destination address) the router location in the protocol of the mapping is updated.

FIG. 7 illustrates a flowchart of an example method for identifying a location of a requested source or destination IP address using location data from mappings of registered network devices at the SDA site or extended access network.

At step 710, in a fabric network, a network controller or control plane of a network fabric is communicatively connected via a subscription publication system to an access switch at a software-defined access (SDA) site of the network fabric.

At step 720, a map server of an SDA site registers one or more mappings of the network device of the SDA site with location data for sending data of the mapping and the location of the network device from the access switch of the SDA site to the network controller or control plane.

At step 730, the network controller learns the location data of a destination address from the one or more mapping received from the access switch by the location data being associated with a mapping at the SDA site and the destination address.

At step 740, the network controller or control plane is configured to identify the location of the destination address from a request that is received by the network controller based on associating the destination address with the location learned from the location data of a mapping that has been registered at the SDA site.

Figure 8:
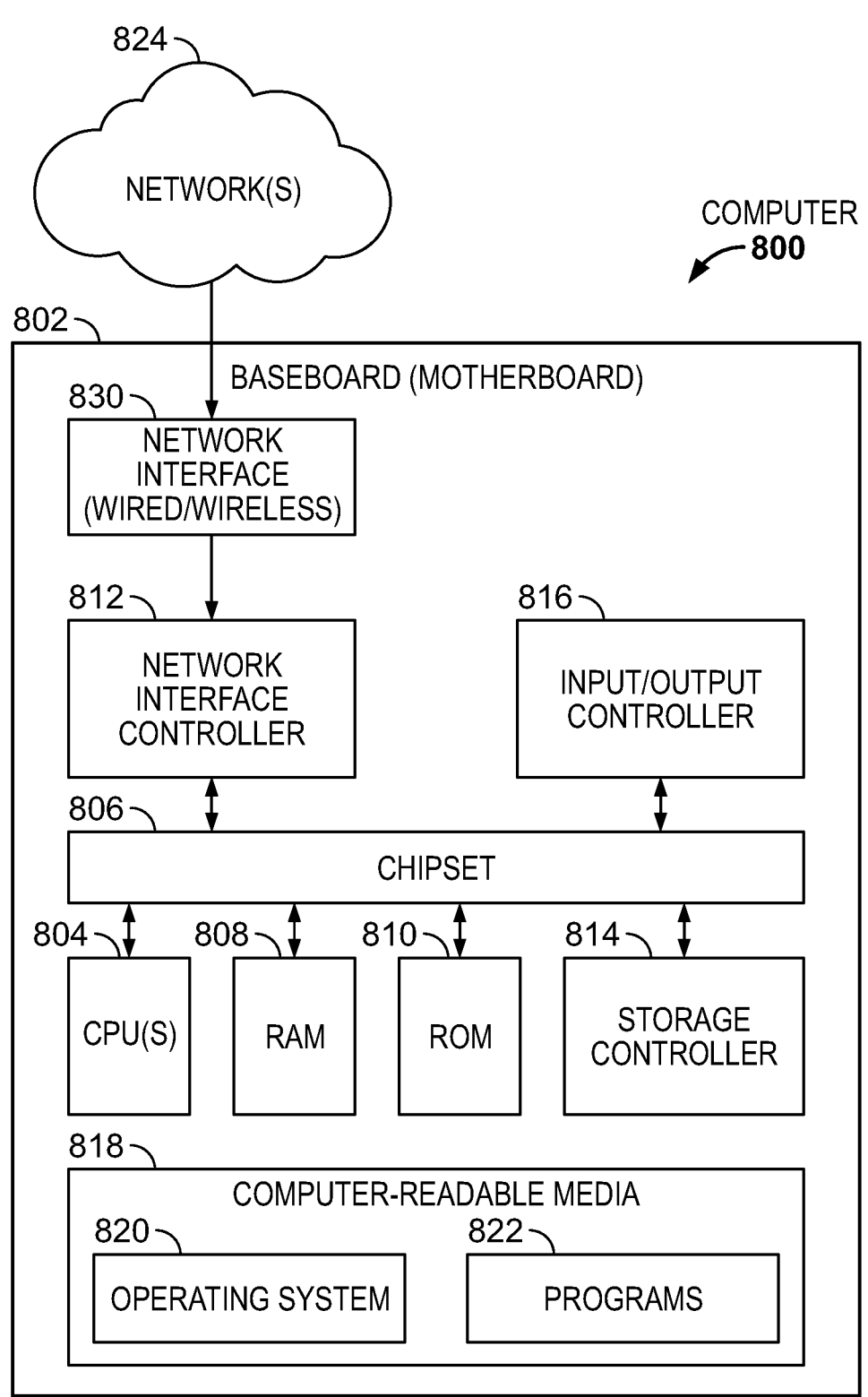
FIG. 8 shows an example of computer architecture for a computer capable of executing program components for implementing the functionality in the fabric network described herein.

FIG. 8 shows an example of computer architecture for a computer 800 capable of executing program components for implementing the functionality described herein. The computer architecture shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to any of the servers, routers, or devices discussed herein. In some embodiments, computer 800 may include networked devices such as servers, switches, routers, hubs, bridges, gateways, modems, repeaters, access switches, etc. Additionally, in some implementations, the programs or software discussed herein may be configured to perform operations performed by any of the devices. In some instances, the computer may correspond to any device described herein and be configured to perform operations performed by any device, and/or maybe a system of devices that perform the techniques described herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPU 804 and the remainder of the components and devices on the baseboard 802. The chipset 806 can provide an interface to a RAM 808, used as the main memory in the computer 800. The chipset 806 can further provide an interface to a computer-readable storage medium such as read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as Network 824. The chipset 806 can include functionality for providing network connectivity through a Network Interface Controller (NIC) 812, such as a gigabit Ethernet adapter. The NIC 812 is capable of connecting the computer 800 to other computing devices over network 824. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other types of interfaces for physically connecting and transferring data between computers and physical storage units.

The computer 800 can store data on the storage device 818 by transforming the physical state of the physical storage units to reflect the information being stored. The specific transformation of the physical state can depend on various factors, in different embodiments of this description. Examples of such factors can include but are not limited to, the technology used to implement the physical storage units, whether the storage device 818 is characterized as primary or secondary storage, and the like.

For example, computer 800 can store information the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete components in a solid-state storage unit. Other transformations of physical media are possible without departing from the scope and spirit of the present description, with the foregoing examples provided only to facilitate this description. The computer 800 can further read information from storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by devices described herein, and or any components included therein, may be supported by one or more devices similar to Computer 800. Stated otherwise, some or all of the operations performed by the network controller, the network control plane, the map server, and or any components included therein, may be performed by one or more computer devices 800 operating in a system.

By way of example, and not limitation, computer-readable storage media can include volatile and non-volatile, removable, and non-removable media implemented in any method or technology. Computer-readable storage media includes but is not limited to, RAM, ROM, erasable programmable ROM ("EPROM"), electrically-erasable programmable ROM ("EEPROM"), flash memory, or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPU 804 transitions between states, as described above. According to one embodiment, the computer 800 has access to computer-readable storage media storing computer-executable instructions which, when executed by the computer 800, perform the various processes described herein. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other types of input devices. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more a router, a border router, and/or a server. The computer 800 may include one or more hardware processors 804 (processors) configured to execute one or more stored instructions. The processor(s) 804 may comprise one or more cores. Further, the computer 800 may include one or more network interfaces 830 configured to provide communications between the computer 800 and other devices, such as the communications described herein. The network interfaces 830 may include devices configured to couple to personal area networks (PANs), wired and wireless local area networks (LANs), wired and wireless wide area networks (WANs), and so forth. For example, the network interfaces 830 may include devices compatible with Ethernet, Wi-Fi™, and so forth.

Clause 1. A method comprising: A method comprising: communicatively coupling a network controller of a network fabric to an access switch at a software-defined access (SDA) site of the network fabric; registering at the SDA site, at least one mapping with location data for sending with the at least one mapping, the location data from the access switch of the SDA site to the network controller; learning, by the network controller, the location data of a destination address from the at least one mapping received from the access switch by the location data being associated with the at least one mapping at the SDA site and the destination address; and identifying, by the network controller, a location of the destination address from a request that is received by the network controller based on associating the destination address with the location learned from the location data of the at least one mapping that has been registered at the SDA site.

Clause 2. The method of clause 1, storing, at a database operatively coupled to the network controller, at least one mapping with the location data sent from the access switch for retrieval by the network controller.

Clause 3. The method of clause 2 wherein the at least one mapping comprises at least one entry of the database wherein the at least one entry is configured in a protocol comprising an endpoint identifier and router location.

Clause 4. The method of clause 3 wherein the router location comprises the location data to be associated with the destination address.

Clause 5. The method of clause 4, further comprising: operatively coupling the access switch to at least one subnet of the network fabric containing the SDA site that comprises the destination address received by the network controller.

Clause 6. The method of clause 5, wherein the protocol of at least one mapping comprises the endpoint identifier associated with a subnet of the network fabric and the router location associated with the destination address.

Clause 7. The method of clause 6, wherein in response to a change of location of the destination address associated with a subnet of the network fabric, the location data of the router location in the protocol of at least one mapping is updated.

Clause 8. The method of clause 7, further comprising: operatively coupling a network device of the subnet to an access point of a fabric network wherein the network device comprises at least one of a hybrid internet protocol (IP) phone or an IP phone to the destination address.

Clause 9. The method of clause 8, further comprising: updating the location data of the router location of at least one mapping in response to a change of location of a hybrid IP phone or an IP phone associated with the destination address.

Clause 10. A method comprising: operatively coupling an emergency responder of a network fabric to a controller of the network fabric; receiving by the controller of the network fabric, at least one mapping from an access switch of the network fabric; requesting by the emergency responder to the controller of the network fabric, location data of a destination address received by the emergency responder from an access switch of the network fabric; and in response to receiving a request from the emergency responder by the controller, identifying by the controller based on the at least one mapping from the access switch, a location associated with the destination address and sending the location by the controller to the emergency responder for determination by the emergency responder of the location of the destination address.

Clause 11. The method of clause 10, wherein at least one mapping is registered at a local map server of a subnet of the network fabric associated with the access switch.

Clause 12. The method of clause 11, storing, at a database operatively coupled to the controller, at least one mapping with the location data sent from the access switch for retrieval by the controller.

Clause 13. The method of clause 12 wherein at least one mapping comprises at least one entry of the database wherein at least one entry is configured in a protocol comprising an endpoint identifier and router location.

Clause 14. The method of clause 13 wherein the router location comprises the location data to be associated with the destination address.

Clause 15. The method of clause 14, wherein in response to a change of location of the destination address in the subnet of the network fabric, the location data of the router location in the protocol of at least one mapping is updated.

Clause 16. The method of clause 15, further comprising: operatively coupling a network device of the subnet comprising at least one of a hybrid internet protocol (IP) phone or an IP phone to the destination address.

Clause 17. A system of a network fabric comprising: one or more processors; and one or more non-transitory computer-readable media storing computer-executable instructions that, when executed by one or more processors, cause the one or more processors to perform operations comprising: receiving at least one mapping from an access switch of the network fabric for determining a location of a destination address; in response to receiving a request from an emergency responder of the network fabric, identifying based on the at least one mapping from the access switch, the location associated with the destination address; and sending the location to the emergency responder for determination by the emergency responder of the location of the destination address.

Clause 18. The system of clause 17, wherein at least one mapping is registered at a local map server of a subnet of the network fabric associated with the access switch.

Clause 19. The system of clause 18, further comprising: storing, in a database, at least one mapping with location data sent from the access switch for retrieval in response to at least the request from the emergency responder.

Clause 20. The system of clause 19, wherein at least one mapping comprises at least one entry of the database, wherein at least one entry is configured in a protocol comprising an endpoint identifier and router location, wherein the router location comprises location data to be associated with the destination address, and wherein in response to a change of location of the destination address in the subnet of the network fabric, the location data of the router location in the protocol of the at least one mapping is updated.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
communicatively coupling a control plane of a network fabric to an access switch at a software-defined access (SDA) site of the network fabric;
receiving, at the control plane, location data indicating a physical location of the access switch;
registering, at the control plane, a mapping between the location data and an endpoint identifier of an Internet Protocol (IP) phone connected to the access switch of the SDA site;
learning, by the control plane, that the IP phone has moved and was previously connected to a different access switch having a different physical location than the access switch; and
based at least in part on the IP phone moving from being connected to the different access switch having the different physical location than the access switch, providing, by the control plane, an indication of the physical location of the access switch to an emergency response system such that the emergency response system is aware of the physical location of the access switch to which the IP phone is connected.

2. The method of claim 1, further comprising storing, at a database operatively coupled to the control plane, the mapping with the location data sent from the access switch for retrieval by the control plane.

3. The method of claim 2, wherein the mapping comprises and entry of the database, wherein the entry is configured in a protocol comprising the endpoint identifier and the physical location.

4. The method of claim 3, wherein the physical location comprises the location data to be associated with the endpoint identifier.

5. The method of claim 4, further comprising:
operatively coupling the access switch to at least one of a subnet or an endpoint of the network fabric containing the SDA site that comprises the endpoint identifier received by the control plane.

6. The method of claim 5, wherein the protocol of the mapping comprises the endpoint identifier associated with a subnet or an endpoint of the network fabric and the physical location associated with the endpoint identifier.

7. The method of claim 6, wherein, in response to, the location data of the physical location in the protocol of the mapping is updated.

8. The method of claim 7, further comprising:
operatively coupling a network device of the subnet or the endpoint to an access point of a fabric network wherein the network device comprises at least one of a hybrid internet protocol (IP) phone or an IP phone to the endpoint identifier.

9. The method of claim 8, further comprising:
updating the location data of the physical location of the in response to a change of location of the IP phone associated with the endpoint identifier.

10. A system comprising:
one or more processors; and
one or more non-transitory computer-readable media storing computer-executable instructions that, when executed by the one or more processors, cause the one or more processors to perform operations comprising:
communicatively coupling a control plane of a network fabric to an access switch at a software-defined access (SDA) site of the network fabric;
receiving, at the control plane, location data indicating a physical location of the access switch;
registering, at the control plane, a mapping between the location data and an endpoint identifier of an Internet Protocol (IP) phone connected to the access switch of the SDA site;
learning, by the control plane, that the IP phone has moved and was previously connected to a different access switch having a different physical location than the access switch; and
based at least in part on the IP phone moving from being connected to the different access switch having the different physical location than the access switch, providing, by the control plane, an indication of the physical location of the access switch to an emergency response system such that the emergency response system is aware of the physical location of the access switch to which the IP phone is connected.

11. The system of claim 10, the operations further comprising storing, at a database operatively coupled to the control plane, the mapping with the location data sent from the access switch for retrieval by the control plane.

12. The system of claim 11, wherein the mapping comprises and entry of the database, wherein the entry is configured in a protocol comprising the endpoint identifier and the physical location.

13. The system of claim 12, wherein the physical location comprises the location data to be associated with the endpoint identifier.

14. The system of claim 13, the operations further comprising:
operatively coupling the access switch to at least one of a subnet or an endpoint of the network fabric containing the SDA site that comprises the endpoint identifier received by the control plane.

15. The system of claim 14, wherein the protocol of the mapping comprises the endpoint identifier associated with a subnet or an endpoint of the network fabric and the physical location associated with the endpoint identifier.

16. One or more non-transitory computer-readable media storing computer-executable instructions that, when executed by one or more processors, cause the one or more processors to perform operations comprising:
communicatively coupling a control plane of a network fabric to an access switch at a software-defined access (SDA) site of the network fabric;
receiving, at the control plane, location data indicating a physical location of the access switch;

registering, at the control plane, a mapping between the location data and an endpoint identifier of an Internet Protocol (IP) phone connected to the access switch of the SDA site;

learning, by the control plane, that the IP phone has moved and was previously connected to a different access switch having a different physical location than the access switch; and based at least in part on the IP phone moving from being connected to the different access switch having the different physical location than the access switch, providing, by the control plane, an indication of the physical location of the access switch to an emergency response system such that the emergency response system is aware of the physical location of the access switch to which the IP phone is connected.

17. The one or more non-transitory computer-readable media of claim 16, the operations further comprising storing, at a database operatively coupled to the control plane, the mapping with the location data sent from the access switch for retrieval by the control plane.

18. The one or more non-transitory computer-readable media of claim 17, wherein the mapping comprises and entry of the database, wherein the entry is configured in a protocol comprising the endpoint identifier and the physical location.

19. The one or more non-transitory computer-readable media of claim 18, wherein the physical location comprises the location data to be associated with the endpoint identifier.

* * * * *